(12) United States Patent
Burnham

(10) Patent No.: US 7,662,205 B2
(45) Date of Patent: Feb. 16, 2010

(54) PROCESSES TO BENEFICIATE HEAT-DRIED BIOSOLID PELLETS

(75) Inventor: Jeffrey C. Burnham, Aiken, SC (US)

(73) Assignee: Vitag Corporation, Beech Island, SC (US)

( * ) Notice: Subject to any disclaimer, the term of this patent is extended or adjusted under 35 U.S.C. 154(b) by 567 days.

(21) Appl. No.: 11/371,238

(22) Filed: Mar. 9, 2006

(65) Prior Publication Data

US 2006/0254331 A1    Nov. 16, 2006

Related U.S. Application Data

(60) Provisional application No. 60/659,434, filed on Mar. 9, 2005, provisional application No. 60/700,730, filed on Jul. 20, 2005.

(51) Int. Cl.
C05F 3/00 (2006.01)
C05F 7/00 (2006.01)
C05F 9/00 (2006.01)
C05F 11/00 (2006.01)

(52) U.S. Cl. .................. 71/11; 71/12; 71/13; 71/14; 71/15; 71/17; 71/21; 71/22; 71/25; 71/64.03

(58) Field of Classification Search ............... 71/11–27, 71/64.03
See application file for complete search history.

(56) References Cited

U.S. PATENT DOCUMENTS

| | | | |
|---|---|---|---|
| 3,655,395 A | 4/1972 | Karnemaat |
| 3,939,280 A | 2/1976 | Karnemaat |
| 3,942,970 A | 3/1976 | O'Donnell |
| 4,154,593 A | 5/1979 | Brown et al. |
| 4,304,588 A | 12/1981 | Moore, Jr. |
| 4,519,831 A | 5/1985 | Moore, Jr. |
| 4,743,287 A | 5/1988 | Robinson |
| 5,238,480 A | 8/1993 | Rehberg et al. |
| 5,275,733 A | 1/1994 | Burnham |
| 5,417,861 A | 5/1995 | Burnham |
| 5,443,613 A | 8/1995 | Robinson |
| 5,466,273 A | 11/1995 | Connell |
| 5,984,992 A | 11/1999 | Greer et al. |

(Continued)

FOREIGN PATENT DOCUMENTS

EP    0143392    6/1985

(Continued)

*Primary Examiner*—Wayne Langel
(74) *Attorney, Agent, or Firm*—Remenick PLLC

(57) ABSTRACT

This invention is directed to systems, devices and methods for modifying the process of producing dried biosolids pellets or granules into beneficiated inorganically-augmented bioorganic fertilizer. The present invention describes a method to beneficiate heat-dried biosolids or sludge pellets or granules as presently manufactured by municipalities or companies from a) dewatered municipal wastewater biosolids or sludges within the municipal wastewater treatment plant heat-dried biosolids production facility or from b) finished dry heat dried biosolids pellets or granules in a separate manufacturing facility from the municipal wastewater treatment plant to produce a fertilizer containing sufficient organic and inorganic plant nutrients to be valuable and saleable into the commercial agricultural industry. The present invention describes beneficiation methods to increase the plant nutrient content to a level which permits the finished beneficiated dried biosolids pellet or granule product to compete in the commercial agricultural fertilizer marketplace and also to reduce the odors associated with traditionally-produced heat dried biosolids.

30 Claims, 6 Drawing Sheets

U.S. PATENT DOCUMENTS

| | | | |
|---|---|---|---|
| 6,159,263 | A | 12/2000 | Greer et al. |
| 6,398,840 | B1 | 6/2002 | Orta-Castro |
| 6,406,510 | B1 | 6/2002 | Burnham |
| 6,409,788 | B1 | 6/2002 | Sower |
| 6,409,789 | B1 * | 6/2002 | Gilbert ................ 71/15 |
| 6,461,399 | B1 | 10/2002 | Connell |
| 6,517,599 | B2 * | 2/2003 | Gilbert ................ 71/15 |
| 6,623,650 | B2 | 9/2003 | Millard |
| 6,666,154 | B2 | 12/2003 | Logan et al. |
| 6,758,879 | B2 | 7/2004 | Greer et al. |
| 6,841,515 | B2 | 1/2005 | Burnham |
| 7,128,880 | B2 | 10/2006 | Dahms et al. |
| 2003/0089151 | A1 | 5/2003 | Logan et al. |
| 2004/0065127 | A1 | 4/2004 | Connell |
| 2004/0120867 | A1 | 6/2004 | Dahms et al. |
| 2004/0177664 | A1 | 9/2004 | Hale |
| 2005/0039508 | A1 | 2/2005 | Burnham |
| 2006/0243009 | A1 | 11/2006 | Burnham |
| 2006/0254331 | A1 | 11/2006 | Burnham |
| 2007/0062233 | A1 | 3/2007 | Burnham |
| 2007/0257715 | A1 | 11/2007 | Semerdzhiev |

FOREIGN PATENT DOCUMENTS

| | | |
|---|---|---|
| EP | 0557078 | 8/1993 |
| FR | 2133115 | 11/1972 |
| FR | 2757504 | 6/1998 |
| JP | 58032638 | 2/1983 |

* cited by examiner

PROCESSES TO BENEFICIATE HEAT-DRIED BIOSOLID PELLETS

REFERENCE TO RELATED APPLICATIONS

This invention claims priority to U.S. Provisional Application No. 60/659,434, entitled "Processes to Beneficiate Heat-Dried Biosolid Pellets," filed Mar. 9, 2005; and U.S. Provisional Application No. 60/700,730, entitled "Process to Increase Plant Nutrient Content in Heat-Dried Organic-Based Sludges," filed Jul. 20, 2005, which are both specifically and entirely incorporated by reference.

BACKGROUND OF THE INVENTION

1. Field of the Invention

This invention is directed to systems, devices and methods for modifying the process of producing dried biosolids pellets or granules, or manure or animal residual pellets or granules, or other organic materials, such as food or pharmaceutical fermentation residuals, formed into pellets or granules into beneficiated inorganically-augmented bioorganic fertilizer. The present invention describes a method to beneficiate heat-dried biosolids or sludge pellets or granules as presently manufactured by municipalities or companies from dewatered municipal wastewater biosolids or sludges to produce a fertilizer containing sufficient organic and inorganic plant nutrients to be valuable and saleable into the commercial agricultural industry.

2. Description of the Background

The disposal of sludges discharged from large-scale wastewater treatment plants is a serious and growing problem. In 1990, the United States Environmental Protection Agency indicated that a family of four discharged 300 to 400 gallons of wastewater per day. From this wastewater, publicly owned treatment works generated approximately 7.7 million dry metric tons of sludge annually or about 64 dry pounds of sludge for every individual in the United States. By the year 2000, these figures had doubled.

The definitions of "sewage sludge" and "sludge" under by Title 40 of the Code of Federal Regulations, Part 257.2, hereby incorporated by reference, is as follows:

"Sewage sludge means solid, semi-solid, or liquid residue generated during the treatment of domestic sewage in a treatment works. Sewage sludge includes, but is not limited to, domestic septage; scum or solid removed in primary, secondary or advanced wastewater treatment processes; and a material derived from sewage sludge. Sewage sludge does not include ash generated during the firing of sewage sludge in a sewage sludge incinerator or grit and screenings generated during preliminary treatment of domestic sewage in a treatment works. Sludge means solid, semi-solid or liquid waste generated from municipal, commercial, or industrial wastewater treatment plant, water supply treatment plant, or air pollution control facility or any other such waste having similar characteristics and effect."

There are several types of sludges that can be produced by sewage and/or wastewater treatment. These include primary sludge, waste activated sludge, pasteurized sludge, heat-treated sludge, and aerobically or anaerobically digested sludge, and combinations of all. These sludges may be from municipal and/or industrial sources.

Most commonly, sludges are dewatered to the best extent possible by chemical and mechanical means. The water content of sewage sludges is still very high. Typical sludges coming out of a gravity clarifier may have a dry solids content of 2% or less. After anaerobic digestion, the solids content can be about 10%. Cationic water-soluble polymers have been found useful for causing further separation between the solids and the water that is chemically and physically bound. Filtration or centrifugation of cationic polymer treated sludge typically yields a paste-like sludge cake containing about 20% solids.

Drying of sewage sludge has been practiced for many years in both the United States and Europe. Sludge drying in the United States prior to about 1965 was undertaken to reduce transportation costs and in pursuit of various disposal options. In some plants, the sludge was dried in powder form and the fine particles were consumed in the combustion chamber of an incinerator or boiler. In the late 1960's two municipalities, Houston and Milwaukee, began to market a pelletized or granulated dried sludge for use as a soil amendment and/or fertilizer. Several more plants for manufacture of dried pelletized sludge were built in the 1980's and 1990's; especially after ocean dumping of sludge by coastal cities was eliminated. Drying and conversion to a pelletized fertilizer was the best option for these metropolitan areas where landfills and land for disposal were limited. However, the investment required for a sludge drying facility is large. A typical unit costs about $150 million for equipment alone.

The most common type of sludge dried and pelletized is anaerobically digested municipal sewage. Anaerobic digestions, as the name suggests, involves treatment by facultative bacteria under anaerobic conditions to decompose the organic matter in the sludge. After a prescribed time and temperature, a sludge relatively free of putrifiable organic matter and pathogens is obtained. Municipal anaerobically digested sewage sludge is therefore preferred for agricultural purposes.

However, dry sewage sludge has several disadvantages for agricultural use. It has low fertilization value, typically having nitrogen content of only about 2-5%. Freight and application costs per unit of nitrogen are high. It often has a disagreeable odor, particularly when moist. It has low density and when blended with other commercial fertilizer materials, it may segregate into piles or may not spread on the field uniformly with other more dense ingredients. Bacterial action may continue and under storage conditions sludge temperature may rise to the point of autoignition. Hence, except for special markets that value its organic content for soil amendment or filler in blended fertilizer, there is little demand for the product. In most cases municipalities must pay freight charges, or may offer other incentives for commercial growers to use the material. However, this is frequently still more economical than alternative disposal schemes.

The market value for fertilizers is principally based on their nitrogen content. A need exists for a practical and economic method for increasing the nitrogen content of sewage sludge to a level approaching that of commercial mineral fertilizers, i.e., 10-20%. Freight costs and the cost of application per unit of nitrogen would then be much lower. Overall value and demand would increase. Moreover, sludge has an advantage in that its nitrogen is of the slow release type. The nitrogen is part of organic molecules and hence is available to growing plants only when the molecule is broken down. This is very desirable since it provides nitrogen to the plant all through its growing cycle. Manufactured slow release nitrogen fertilizers have a price nearly 10 times that of ordinary mineral nitrogen fertilizers. Conceivably, municipalities would enjoy a credit rather than an expense in disposing of their dried sludge product if the total nitrogen content can be increased and the tendency for autoignition reduced or eliminated.

Prior attempts have been made to reach some of these objectives. U.S. Pat. Nos. 3,942,970, 3,655,395, 3,939,280, 4,304,588, and 4,519,831 describe processes for converting sewage sludge to fertilizer. In each of these processes a urea-formaldehyde condensation product is formed in situ with the sludge. However, the processes require the handling of formaldehyde, a highly toxic lachrymator and cancer suspect agent.

French Patent No. 2,757,504 describes the blending of mineral fertilizers with organic sludge. The mixture is heated to a temperature between 200° C. and 380° C. Japanese Patent No. 58032638 describes a process where sludge is treated with sulfuric and nitric acids or sulfuric and phosphoric acids and ammonia under elevated pressure of about 3 atmospheres. These prior art processes require costly process equipment and/or special conditions not readily incorporated in existing sewage treatment facilities.

The simplest method of increasing the nitrogen in sludge would be to add commercial nitrogen fertilizer materials to the wet sludge prior to drying and pelletizing. There are only a few high-nitrogen fertilizer materials that are economic for use in agriculture: ammonia (82 wt. % N), urea (37 wt. % N), and ammonium nitrate (35 wt. % N). Ammonia has high volatility and is subject to strict regulation of discharges to the atmosphere. Urea is a solid that adsorbs moisture quite readily and makes the sludge more difficult to dry. It is also highly susceptible to breakdown to ammonia by the microbes and enzymes in sludge, resulting in nitrogen loss and an odor problem. Ammonium nitrate is a strong oxidizer and creates a potential explosion problem. All of these fertilizers have high nitrogen content: but are unsuitable for combining with sludge.

Another possible candidate that has been unsuccessfully tested by the industry as an additive to sludge is ammonium sulfate. Although ammonium sulfate has lower nitrogen content (21 wt % N) than the materials discussed above, it has a price per unit of nitrogen comparable to that of the other commercial fertilizers. It is also relatively inert to the microbes and enzymes in sludge.

It has been found in full-scale plant trials that a problem occurs during the drying of a mixture of ammonium sulfate and sludge. Title 40 of the Code of Federal Regulations, Part 503, Appendix B specifies that the temperature of the sewage sludge particles must exceed 80° C. (176° F.) or the wet bulb temperature of the gas in contact with the sewage sludge must leave the dryer at a temperature exceeding 80° C. (176° F.). However, when drying a mixture of ammonium sulfate and sludge, a sudden release of ammonia vapors occurs at about 60° C. (140° F.) overwhelming the air pollution control system. Several attempts at addition of ammonium sulfate to sewage sludge in several different plants over several years have foundered on this problem. The discharge of ammonia to the atmosphere is environmentally intolerable. Consequently, ammonium sulfate addition to sewage sludge has not been successful to date.

European Patent No. 0143392 B1 describes a process in which an undigested liquid sludge is mixed with salts such as ammonium sulfate at a concentration of 17-47 wt. % at a pH of 2-6 for a period of 3 to 12 hours followed by disposal. Japanese Patent No. 9110570 A2 describes the treatment of sewage sludge with an acidic solution followed by drying to reduce ammonia evolution and to retain the effective nitrogen. Therein is described the use of dilute (0.3 Normal) aqueous solutions of HCl, $H_2SO_4$, and wood vinegar as ammonia binders ("Granulation of Compost From Sewage Sludge. V. Reduction of Ammonia Emission From Drying Process", Hokkaidoritsu Kogyo Shikenjo Hokoku, 287, 85-89 (1988)).

None of these references disclose the use of acids with ammonium sulfate additions and neither reference discusses the issue of corrosion of steel process equipment under acid conditions.

Over the past thirty years alkaline stabilization of sludges has been a standard and successful method of making sludges into beneficially useful materials that can be used principally as soil-conditioning materials. Because these sludges have high calcium carbonate equivalencies, they have been produced and marketed as AG-lime materials, usually as a replacement for calcium carbonate in farm soil management strategies. Because of this usage the value of these materials has been restricted to only a few dollars per ton of product, they are economically and geographically restricted because of transportation costs to areas close to the source of their treatment. Many of these alkaline-stabilized sludges contain up to 65% water.

Thus, there is a long standing need for practical means of increasing the economic value of sewage sludge through increasing its nitrogen content, and increasing its ability to be spread as well as a need to treat these materials such that they are converted into commodity fertilizers with physical and chemical and nutrient properties such that they can command significant value in the national and international commodity fertilizer marketplace. The present invention meets those needs.

SUMMARY OF THE INVENTION

The invention overcomes the problems and disadvantages associated with current systems and methods of manufacturing fertilizers from sludge and related waste materials, and also the fertilizers prepared by these methods.

One embodiment of the invention is directed to a method for the manufacture of a fertilizer comprising mixing an oxidant to Another embodiment of the invention is directed to Other embodiments and advantages of the invention are set forth in part in the description, which follows, and in part, may be obvious from this description, or may be learned from the practice of the invention.

DESCRIPTION OF THE INVENTION

Figure 1:
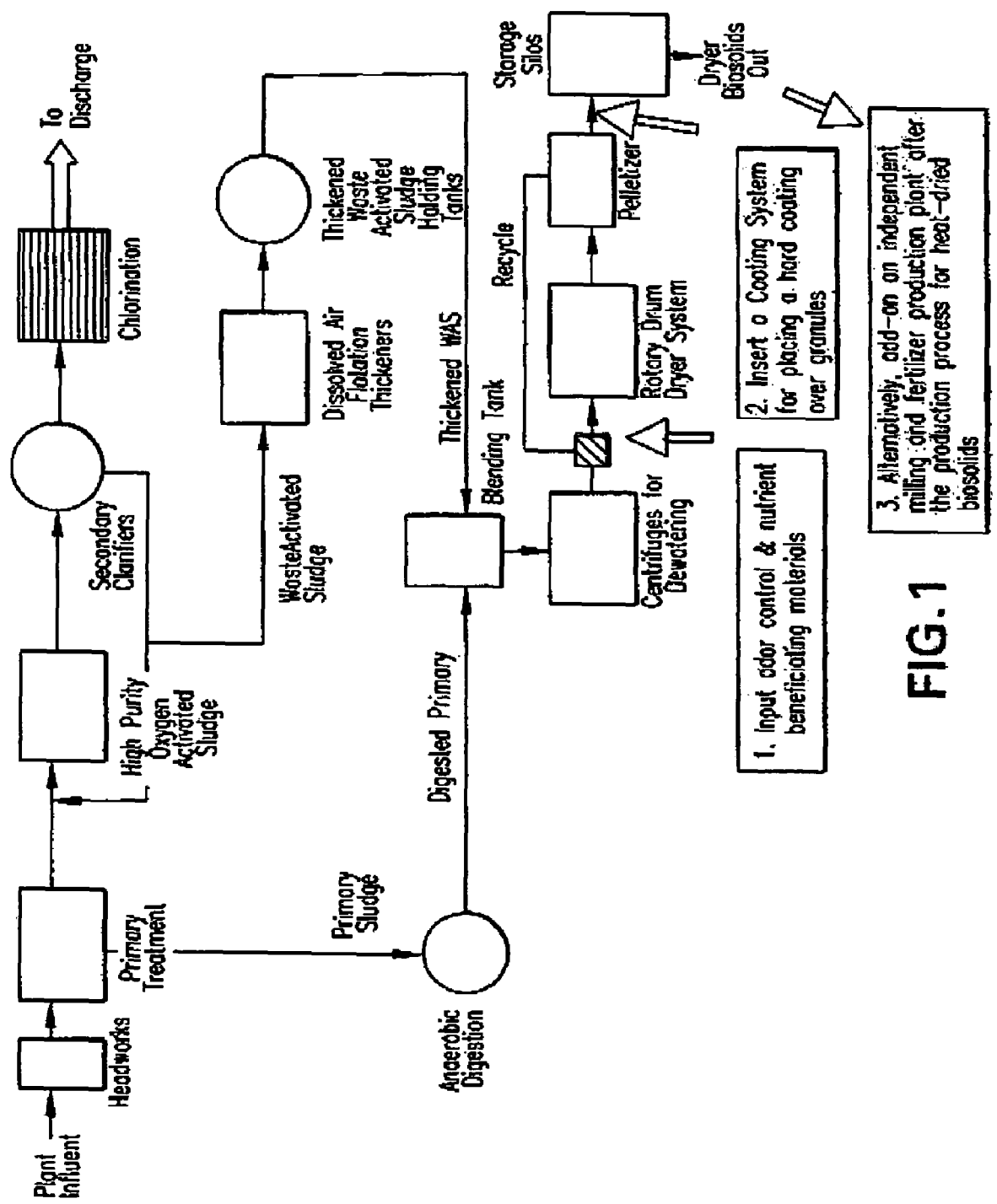
FIG. 1 Municipal Wastewater Treatment Plant Schematic Illustrating Three Beneficiation Treatment Input Sites.

The present invention creates an inorganically-enhanced bioorganic fertilizer by modifying the biosolids heat-drying pellet or granule (hereafter referred to as "pellet" or "pellets") manufacturing processes presently used by many U.S. and worldwide municipal wastewater treatment plants. In addition, the present invention teaches treatment of sludges or biosolids to reduce noxious odorants prior to the drying step or steps in the manufacture of heat dried pellets and further teaches the addition of specific chemicals such as one or more oxidants selected from the group comprised of iron oxides such as ferrates, other metal oxides, oxygen, hydrogen peroxide, other peroxides, ozone and chlorine dioxide to further reduce odors. The present invention teaches that the use of these methods individually and more importantly in combination creates a beneficiated heat dried pellet. In the art, beneficiated is known as inorganically-augmented.

The fertilizer dried pellet created by the present invention can be chemically adjusted to fit the needs of nitrogen, phosphorus and/or potassium fertilizer requirements by containing significant amounts of nitrogen, phosphate and other plant nutrients like potassium, sulfur and/or calcium to: a) enhance commercial valuation, b) react with odorants; and, c) to create a pellet with increased nitrogen, phosphorus or other plant nutrient, e.g., potassium and/or sulfur such that the treated finished product can be sold profitably into the commercial marketplace. The advantages associated with the present invention over the state of the art are numerous and include any or all of the following: reduction of odors of the dried pellets, increased nitrogen content in the dried pellet, increased phosphorus content in the dried pellet, increased iron content in the dried pellet, increased potassium content in the dried pellet and/or increased potassium content in the dried pellet and/or increasing the calcium content or other mineral content in the dried pellets.

Further, this present invention creates a valuable commercial agricultural fertilizer as a final product. The product of the present invention will have significantly more value than the dried pellets presently manufactured by municipalities or companies under contract to municipalities to process their biosolids via heat-drying technologies since heat-dried biosolids pellets contain only 3% to 6% nitrogen by weight and the present invention teaches that its product contains 8% to 22% nitrogen by weight. The present invention describes adding materials such as, preferably, concentrated phosphoric acid, concentrated sulfuric acid, anhydrous ammonia, aqueous ammonia, ammonium hydroxide, ammonium sulfate, ammonium monophosphate, ammonium diphosphate, urea, methylene urea, sulfur-coated urea, potassium hydroxide, potash, calcium hydroxide, calcium oxide, attapulgite clay, ferric oxide, ferric sulfate, magnesium oxide, magnesium sulfate, byproducts such as cement kiln dust, lime kiln dust, fly ash and wood ash, and combinations thereof. Also, the present invention teaches that use of subspecification or substandard preparations of the above materials, especially the traditional plant fertilizers such as ammonium phosphates, ammonium sulfates, urea, the slow-release ureas such as methylene ureas and sulfur-coated ureas, are desirable and use of such materials enhances the economics of the processes of the present invention.

The present invention treats the biosolids of a municipal wastewater treatment plant such that the odorant characteristic of the biosolids are modified to create a less odorous product upon heat drying. Further the present invention treats these biosolids to increase the level of plant nutrients that will be contained and plant available in the finished heat dried pellet or granule. The chemical additions are made to the dewatered biosolids in the typical heat drying plant immediately following the dewatering step as carried out by belt filter press or centrifuge operations. The chemical additions are added to the dewatered biosolids by means of a mixer that blends the additives with the biosolids mix such that the additives have the opportunity to completely interact and react with the chemical components of the biosolids. Dewatered, to those in the art, refers to approximately 8-40% dried biosolids. Dried biosolids generally refers to above 75%, more preferably above 80% and most preferably above 90% dried solids.

In one embodiment of the present invention, a concentrated acid or mixture of concentrated acids, such as phosphoric acid and/or sulfuric acid is/are introduced to the dewatered biosolids prior to the drying step in the pellet/granule manufacturing process. Further, the acid pH created by such acid addition is neutralized to a pH within the range of pH 4.5 to 7.0, more preferably within the range of pH 5.0 to pH 6.5, and more preferably within the rang of pH 5.5 to pH 6.2. Such a preferred desirable pH range is that preferred by fertilizer distributors and/or the end users, i.e., the growers/farmers. The effect of this interaction and reaction is to lessen the odor associated with the finished heat dried product and to increase the plant nutrient chemical content and value of the finished heat dried product.

The present invention describes the addition of concentrated phosphoric acid, e.g., 70% as super phosphoric acid and/or 50-60% phosphoric acid (black or agricultural grade phosphoric acid) directly to the dewatered biosolids after dewatering. The addition of said phosphoric acid not only reduces the odor associated with such biosolids but simultaneously increases the phosphorus (P) content of the finished product. The acid pH which results from this addition is neutralized by selecting a material from the group, anhydrous ammonia, aqueous ammonia, ammonium hydroxide, potassium hydroxide, potash, calcium hydroxide, calcium oxide, attapulgite clay, ferric oxide, ferric sulfate, magnesium oxide, magnesium sulfate, and also from byproducts such as cement kiln dust, lime kiln dust, fly ash and wood ash. Additions of any or combinations of these simultaneously will increase the concentration of plant nutrient or soil conditioner in the finished product and thereby increase the value of the finished product. The additions of concentrated acids and subsequently of ammonia, either as aqueous ammonia or anhydrous ammonia or ammonium ions, will have the dual effect of bringing the mixture pH to a desired range and will have a disinfecting role in destroying pathogens that are contained in the dewatered biosolids prior to the drying step of the pellet/granule manufacturing process.

Further the present invention teaches the use of oxidants such as ferrate, hydrogen peroxide, ozone and chlorine dioxide in reducing the odor of said heat dried pellets. Further the present invention teaches the use of iron oxide and other forms of iron, such as iron sulfate which can be mixed directly with the dewatered biosolids and subsequently also react with odorant molecules contained within the dewatered biosolids thereby resulting in a mix of improved odor characteristic.

One of the benefits of the present invention is that it utilizes existing manufacturing operations for the production of the beneficiated heat dried pellets thereby removing the costly requirement of constructing such manufacturing plants de novo.

A further benefit of the present invention is that if a municipality does not want this add-on process to occur within its own heat-dried biosolid manufacturing plant, the option exists for the process of the present invention to occur separately following the production of the traditional heat-dried biosolids pellets by taking said dried biosolid pellets or granules to a separate facility. In this separate facility, the heat-dried pellets can be milled into powder and the present invention then uses said powder in a process to create a valuable high nitrogen plant nutrient-containing fertilizer that will compete in the agricultural wholesale and retail fertilizer marketplace.

The present invention reverses the nature of the product made by the process as taught in U.S. Pat. Nos. 5,984,992; 6,159,263; and 6,758,879 for manufacturing an organically-enhanced inorganic fertilizer. The present invention creates an inorganically-enhanced bioorganic fertilizer by modifying organic-containing heat-dried biosolids or sludge pellet or granule manufacturing processes. A preferred example is the modification of conventional heat-dried municipal biosolids pellets. Such modification permits the addition of materials into or after the pellet manufacturing process which add significant plant nutrients to beneficiate or enhance the value of said pellets in the commercial agricultural fertilizer marketplace and reduce the odor commonly associated with traditional heat-dried pellets. In addition, the present invention teaches a method for treatment of sludges or biosolids to reduce noxious odorants associated with traditional heat dried biosolids pellets.

Heat dried pellets of biosolids are often buried or landfilled because their plant nutrient level and commercial value will not permit transportation and use in commercial agriculture. Many others are sold at a price that requires subsidy to support the transportation costs to bring the pellets from the manufacturing plant to the end user. The present invention enhances the value of said pellets and thereby permits and enhances the use of such a resource as dried municipal biosolids into a mature marketplace.

Further, the present invention utilizes portions of conventional methods, such as the AM or Ammonium Melt Fertilizer Manufacturing Process (see U.S. Provisional Patent Application No. 60/654,957) to create new and more valuable fertilizers using the heat-dried biosolids pellet manufacturing process described in the present invention. Alternatively, the finished heat-dried biosolids pellets themselves can be used in a separate process independent from the manufacture of the original heat-dried biosolids pellets.

Municipal wastewater sludge heat-dried pellet production creates a pellet which has either no or a low value on the commercial agricultural fertilizer marketplace. This is because of the odors associated with such products and because of the low plant nutrients contained in such products. The present invention has the advantage of the traditional production of heat-dried biosolids in that it reduces said odors associated with the finished pellets and simultaneously adds plant nutrients which increase the value of the finished pellets or granules. It is the teaching of the present invention that said odor control and plant nutrient enhancement can be accomplished by adding the same chemical materials, e.g., concentrated phosphoric acid (P), aqueous ammonia (N) and or ferrate solution (Fe).

First Preferred Embodiment

In a preferred embodiment of the present invention, finished heat-dried biosolids are removed from a municipal wastewater plant that manufactures said heat-dried biosolids and transports them to a separate manufacturing plant, preferably as close to the municipal wastewater treatment plant as possible, for milling and processing into a high nitrogen containing bioorganic fertilizer. In this preferred embodiment, milling converts the dry (80% to 100% solids, preferably 95% to 100% solids, and more preferably 98% to 100% solids) pelletized or granular heat-dried biosolids pellet into a powder which can then be further processed. As shown in FIG. 1, finished dry heat-dried biosolids pellets or granules are removed from a typical municipal wastewater treatment plant biosolids production process and taken to a separate manufacturing facility for conversion into a plant nutrient rich valuable fertilizer.

Figure 2:
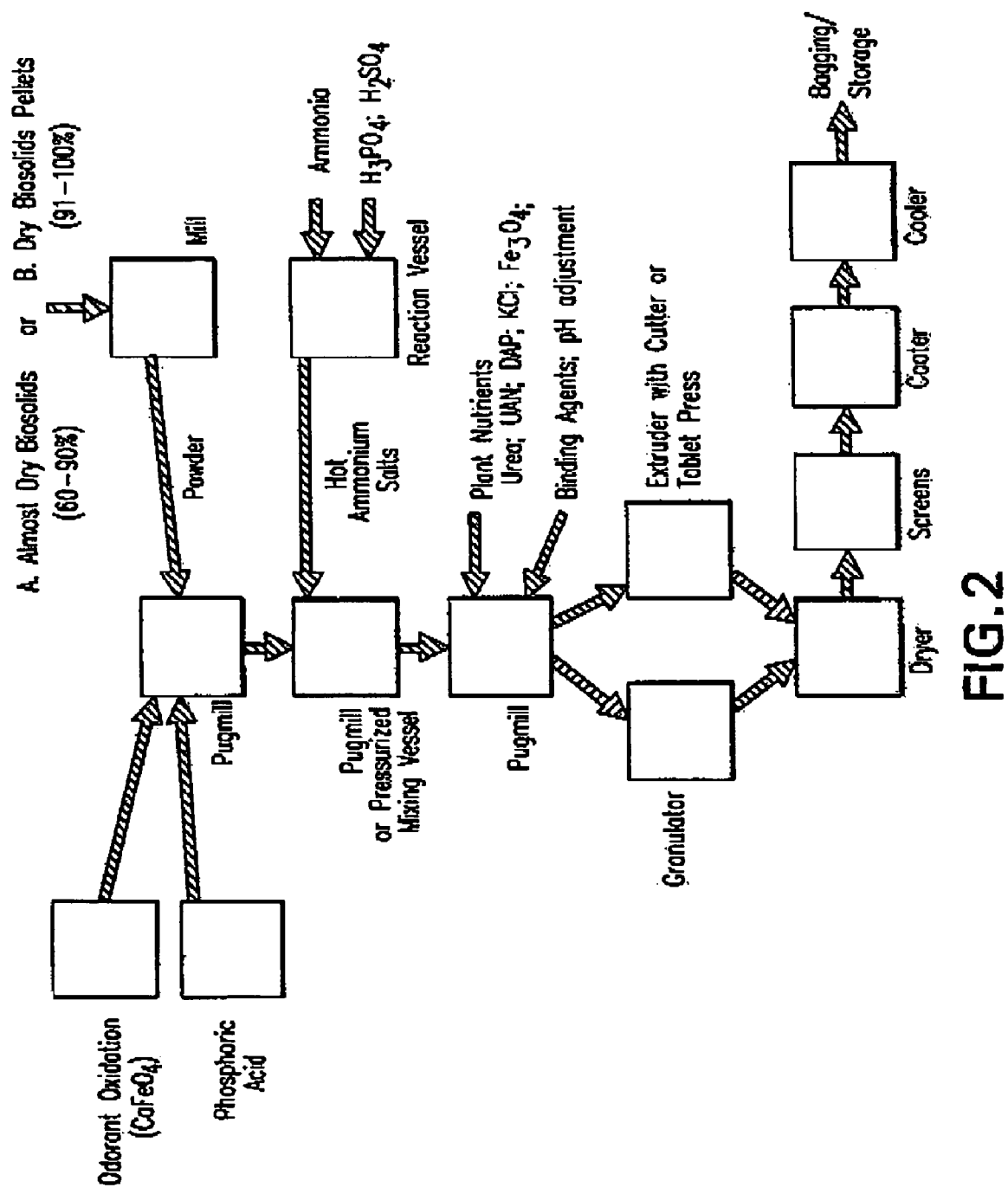
FIG. 2 The PB or Pellet Beneficiation Process Preferred Embodiment.

At this separate facility the process is as illustrated in FIG. 2. Nearly dry or very dry municipal biosolids or organic sludges are milled into powder and passed into a mixer, most commonly a twin shafted pugmill that contains plow shaped paddles. This pugmill is preferably heated by means of an oil-heated jacket or oil-heated hollow paddles or both. Ferrate, either calcium or sodium or potassium salt form, is manufactured on site and pumped directly into the mixer to oxidize any reduced sulfur compounds present in the powder and to oxidize and react with organic odorants present. Further the ferrate reacts with the protein content of the powder and cleaves some of the peptide and amino acid bonds present in the protein to make smaller monomers which are biologically less active.

Other odor control agents such as hydrogen peroxide and or chlorine dioxide or ozone or a combination of these may also be added into this first mixer. Concentrated phosphoric acid, preferably 54% P agricultural grade phosphoric acid is next pumped into this mixer to first neutralize and then acidify the mix and to react with odorants present in the powder. The mixer creates a thixotrophic mixture from the dry biosolids powder coupled to the acid and the odor control agent solution or solutions. This mix is then passed to a second mixer which may be a pugmill of similar description or may be a pressure vessel which is capable of receiving a hot mix of ammonium salts comprised of ammonium phosphate and or ammonium sulfate. Said second mixer may also be heated by an oil-heated jacket. Pressures in said second mixer will exceed atmospheric pressure and may increase in the heated pressure vessel to exceed 10 atmospheres. The preferred pressure will be in the range of 1.5 to 20 atmospheres, more preferably in the range of 3 to 10 atmospheres, and most preferably in the range of 5 to 8 atmospheres. The macromolecular components, especially the proteins, present in this mix contents of this pressure vessel will partially hydrolyse and will partially lose their biologic activity proportional to the time and pressure of their residual time in said vessel. Further, said chemical and physical heating that occurs in this second mixer will serve to reduce any pathogens present to less than the standards of the USEPA's Part 503 rule for Class A biosolids products. Further, and more preferably, passage of the mix through this second mixer will sterilize the mix destroying all viable microorganisms present.

The mix, upon determination of completion of the reactions present in the second mixer, will be discharged to a third mixer. Preferably the third mixer is a pugmill, as described earlier. The purpose of this third mixer is to blend into the fertilizer mix other plant nutrients as may be required for the manufacture of the finished fertilizer. One or more of these may be ammonium hydroxide, ammonium sulfate, ammonium monophosphate, ammonium diphosphate, urea, methylene urea, sulfur-coated urea, potassium hydroxide, potash, calcium hydroxide, calcium oxide, attapulgite clay, ferric oxide, ferric sulfate, magnesium oxide, magnesium sulfate, and also from byproducts such as cement kiln dust, lime kiln dust, fly ash and wood ash, or combinations thereof. Further, this group includes solutions of granulating or hardening agents such as industrial molasses or lignon or aluminum sulfate to cause the hardness of the finished fertilizer granule or pellet to be of agricultural grade hardness, preferably 4 to 10 pounds hardness, more preferably in the range of 5 to 8 pounds hardness, and most preferably in the range of 6 to 7 pounds hardness. This third mixer also contains the capability of having steam and water vapor, which emit from the mix under the heat conditions present in the mixer, removed to be later condensed and either placed back into the first mixer to facilitate the production of a thixotrophic mix or removed from the process and facility, preferably returned to the municipal wastewater treatment plant. This removal of moisture from the mix is crucial to achieving the proper percent solids of the mix for extrusion, tablet formation or granulation, i.e., the shape-forming next step in the process.

The mix is discharged to either a granulator or to a extruder or to a tablet forming machine for shaping into the fertilizer form prior to drying. Each of these shape forming devices are commercially and commonly available in the art and each requires a different percent solids to the mix exiting the third mixer and so it is an important component of this preferred embodiment of the present invention that adjustment of the percent solids in this third mixer can take place in a controlled manner and preferably under automated computer control.

This shaped fertilizer is then dried to greater than 90% solids and more preferably to greater than 95% solids and even more preferably to greater than 97% solids. The dryer is preferably a fluidized bed apparatus using hot air to dry the shaped fertilizer but it may be a hot air rotary drum dryer as well. Other drying apparatuses are also possible in this step such as a vacuum drying apparatus, preferably a rotary vacuum drying apparatus.

After completion of sufficient drying as described above the fertilizer is screened to remove oversize material or any fines or dust associated with the fertilizer. The oversized material is returned to the input dried biosolids stream and milled and added to the first mixer in the process. The dust is similarly returned to the mix and added to the first mixer in the process. By recovery of said by products there is no waste from this process. Also it should be clear that when extrusion or tablet making is selected as the preferred method of shaping the fertilizer there is no need for the massive equipment associated with granulation requiring ratios of 4 parts of seed bed to 1 part of incoming mix. Further at times the recycle ratio may reach 8 parts seed bed to 1 part incoming mix and therefore requires huge rotating granular machine to accommodate such granuation technology. Such downsizing affects the sizing of the manufacturing plant and directly affects the economics of the manufacturing process.

After the screening the shaped fertilizer is optionally coated with a commercially available deduster chemical mix in a coating apparatus. After coating or after screening if no coating then the fertilizer is cooled in a cooling apparatus and conveyed to a dry storage facility at ambient conditions. The finished product is preferably bagged or shipped in bulk.

Second Preferred Embodiment

Figure 3:
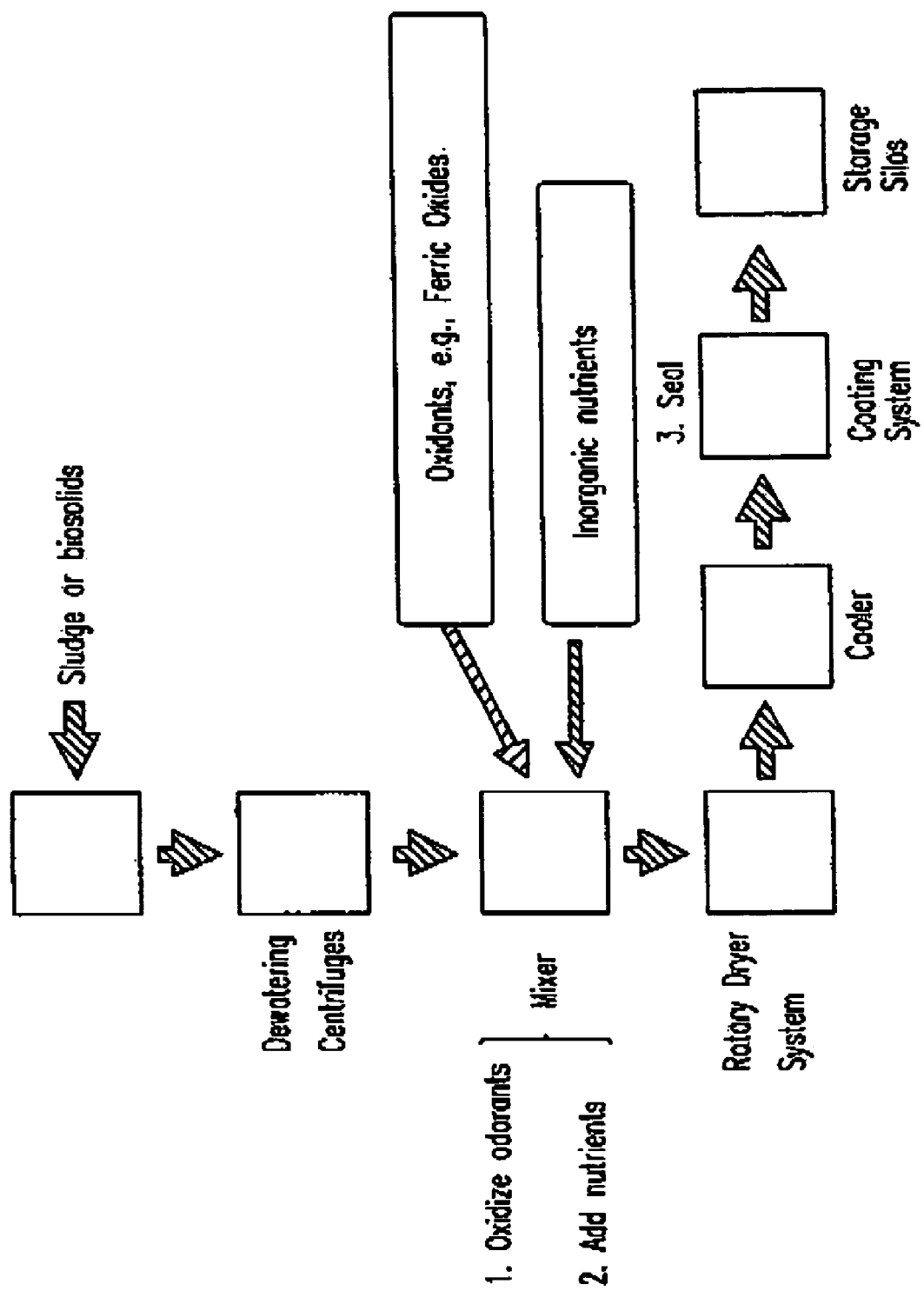
FIG. 3 The Pellet Beneficiation Process.

In a second preferred embodiment of the present invention, nutrient and odor control chemicals are inserted into the process stream within the heat-drying plant itself. This is accomplished by retrofitting existing municipal biosolids heat drying operations or manufacturing plants. The steps of the second embodiment are illustrated in FIG. 3. In FIG. 3, equipment supplied for the pellet beneficiation process are indicated in the solid or green blocks. The dewatered biosolids are conveyed to a first mixer, preferably a pugmill, as described in the preferred embodiment. The biosolids are then treated in this mixer with one or more odor control agents such as calcium ferrate as described for the preferred embodiment. The odor treated mix is then acidified in this mixer with concentrated phosphoric acid in order to control odors and commence biosolids disinfection and to facilitate production of a thixotrophic mix in the first mixer or pugmill as also described in the preferred embodiment. Additional phosphoric and sulfuric acid is then mixed with the mix. Commercially available aqueous ammonia, normally 21% N in concentration, is then added to the mixer and allowed to react with the excess acid present in the mix. Such reaction results in exothermic heat production facilitating further mixing and facilitating reaction of the hot ammonium salts with the organic molecules present in the mix. Further the hot physical chemical conditions of the mix within this mixer will cause the partial hydrolysis of some proteins present in the mix from the heat-dried biosolids that was put in the first step of this embodiment. Use of aqueous ammonia is also useful in that it is easier to obtain regulatory permits for its use in and near municipal wastewater treatment plants further reducing logistics and liabilities associated with said fertilizer manufacture. This hot fertilizer mix is discharged to a second mixer such as a pugmill as described in the preferred embodiment. Additional required plant nutrients selected from the group described in the preferred embodiment may then be blended into the fertilizer mix. Further granulating agents and hardeners may be added to this mixture to control hardness of the finished granule as described above. Further, blending of alkaline materials is an option in this second mixer to create the proper pH of the mix from the acidified biosolids mixture to produce a resultant mix of pH of between pH 4.5 and pH 7.0. This second mixer is also capable of having water vapor and or steam removed to produce an viscous material that can be further processed as required by the shaping mechanism selected, i.e., similar to the preferred embodiment consisting of extrusion, tablet formation or granulation. Further processing of this second embodiment is as described for the preferred embodiment.

In a modification of the second embodiment of the present invention, anhydrous ammonia is preferably used in a manner as taught by pending U.S. Utility Patent Application that claims priority to U.S. Provisional Application No. 60/654, 957 as significant exothermic heat reaction occurs introducing even more physical heat and pressure as a disinfecting process to the biosolids prior to their drying step in the manufacture of high nitrogen containing pellets or granules.

Third Preferred Embodiment

Figure 4:
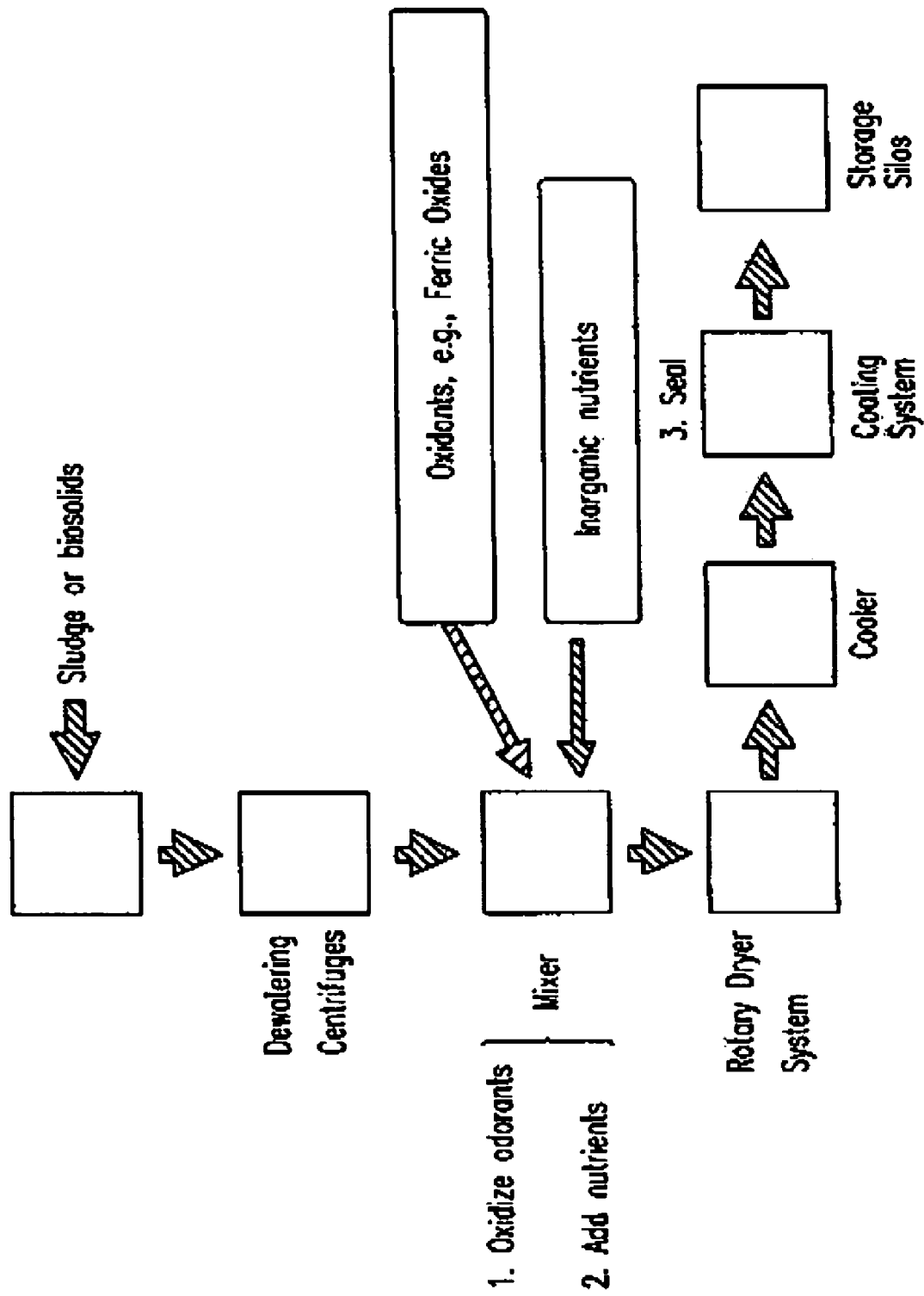
FIG. 4 The Bio-Tablet or Bio-Extrusion Pellet Beneficiation Process.

The third preferred embodiment describes adding to the sludges or biosolids within a wastewater treatment plant manufacturing heat-dried biosolids as illustrated in FIG. 4, odor control agents such as ferrate or hydrogen peroxide followed by adding to the biosolids, nutrient materials, preferably, solid fertilizers, ammonium sulfate, ammonium nitrate, mono-ammonium phosphate, di-ammonium phosphate, potash, urea and combinations thereof. Further, this embodiment teaches liquid fertilizers, such as urea ammonium nitrate ("UAN"), are mixed with the biosolids prior to drying and liquid fertilizer. Finally, materials may be added to the mix selected from the group, ammonium hydroxide, potassium hydroxide, potash, calcium hydroxide, calcium oxide, attapulgite clay, ferric oxide, such as ferrate, ferric sulfate, magnesium oxide, magnesium sulfate, and also from byproducts such as cement kiln dust, lime kiln dust, fly ash and wood ash. This embodiment is a simple odor control and nutrient enrichment of the biosolids prior to being dried by the mechanisms already present in the heat-dried biosolids production system used by the municipal wastewater treatment plant. This is as much as a non intrusive addition of materials within the wastewater treatment plant as is possible and still produce the desired nutrient enhanced valuable product.

Fourth Preferred Embodiment

A process of fertilizer manufacture accomplished by modifying existing or to be built organic heat drying operations or manufacturing plants to cause the manufacture of a beneficiated dried organic pellet or granule that has an inorganic plant nutrient value sufficient to be competitive on the commercial agricultural marketplace comprising:

Acidifying dewatered biosolids prior to drying with concentrated phosphoric acid in order to control odors and commence biosolids disinfection;

Producing a blended thixotrophic mix of the dewatered biosolids with the concentrated acid;

Blending conditioners and hardeners to this mixture to control hardness of the finished granule;

Blending ammonia with the blended mix of acid with dewatered biosolids;

Blending plant nutrients with the blended mix of acid, ammonia and dewatered biosolids;

Removing water from the mixture as steam and water vapor to produce an viscous material that can be further processed;

Creating a soil-like material or pellets or granules from said mixture;

Drying said material to greater than 90% solids;

Cooling said dry material; and,

Storing said dry material in a dry environment protected from the weather until transported for use as fertilizer.

The following examples illustrate embodiments of the invention, but should not be viewed as limiting the scope of the invention.

EXAMPLES

Example 1

This example describes the approach of chemically and biologically modifying the dewatered biosolids prior to drying such that the odor of the pellet product is significantly improved. Dewatered biosolids are preferably above 8% solids, more preferably above 15% solids, more preferably above 25% solids, and most preferably approximately 40% solids. This exemplary embodiment also creates added value to the pellet product for sale into the fertilizer market for commercial agriculture.

Figure 5:
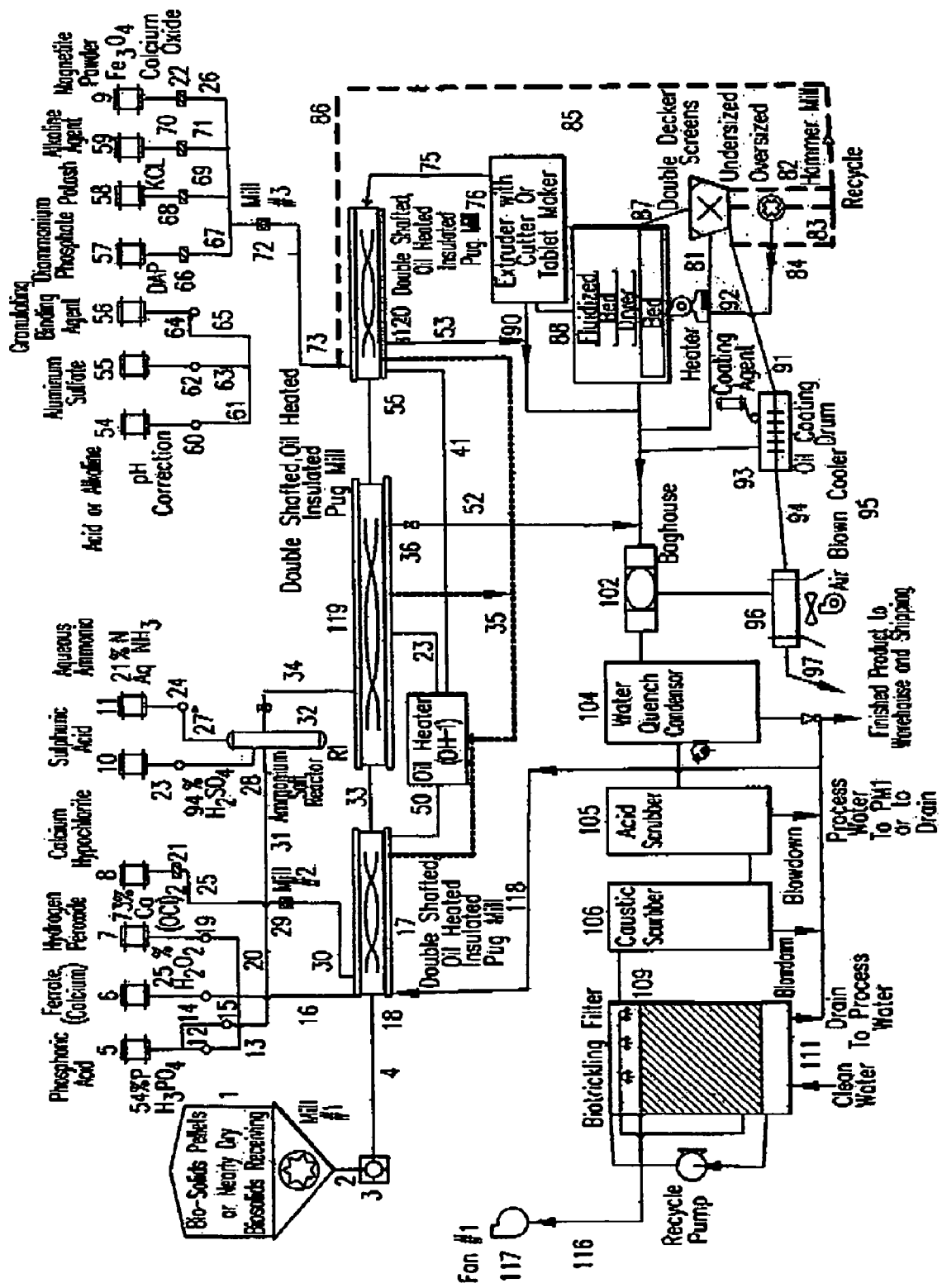
FIG. 5 The PB Bio-Extrusion Fertilizer Process Schematic.

The illustration of this Example can be found in FIG. 5. This is a more detailed description of the first embodiment of the present invention. The process employs three pugmills in sequence to accomplish the production of the beneficiated heat-dried pellets. Heat-dried biosolids are received into an augured hopper (1). This is sized to accept up to one full 20 ton container of dried biosolids. The live bottom bin contains one or more augers (2) that move the pellets to a mill (3) which pulverized the pellets into a powder. The powder leaves the mill at a defined rate (4) to the first mixer (17) where the powder is conditioned and prepared for later mixing with a hot melt of ammonium salts. This mixer is optimally a pugmill configured with double shafts that may be hollow to accept heated oil which will begin the process of heating the biosolids. Alternatively, heat may be applied through a jacket configuration around the pugmill with heated oil (23) supplied by an oil heater (50).

Pugmill #1 (17) has on its anterior end an injection ring (18) which permits the addition of liquid materials to the powder also entering the pugmill. There are several additions that may be made to the heat-dried biosolids powder in pugmill #1. The first of these are the additives for odor control that are added to the powder to control or eliminate the traditional musky nitrogenous odor of dried biosolids. Dependent upon the concentration of the ferrate, some process water (118) may be added into this pugmill #1 to assist in creating a thixotrophic paste for the ferrate and other odor control agents to react with. Ferrate (sodium or calcium) (6), a liquid is added as a very strong oxidant to control reduced sulfur compound and nitrogenous odors present in the biosolids. The calcium (or sodium) ferrate is added from apparatus (6) at rate (15) through control of a pump (14). This oxidative agent is very effective at destroying the odorants present in the mix when used at 1 to 10 percent and preferably at 2 to 5 percent of the volume of wet powdered biosolids contained in the pugmill #1 contained at an estimated concentration of 55% solids. The ferrate is known to react very effectively with reduced sulfur compounds present in the mix. It also is a strong enough oxidant to actually denature proteins and is even capable of disrupting the bonds between amino acids. Such denaturing of proteins and disruption of molecular bonds can alter the odorant characteristics of the biosolids mix thereby improving the odor of the resultant product of the invention. Additionally, two other oxidative materials may be added in this embodiment. Liquid hydrogen peroxide (7) at 25 to 50% concentration is added by control of pump 19 at rate 20, between 1% and 5% of the biosolids delivery rate 16 to injection ring 18 into pugmill #1 (17). Optionally, calcium hypochlorite (8), a solid, may be delivered by screw conveyor 21 to a pulverizing mill 29 and then to an additive port (30) at a rate (25) equal to between 1% and 5% of the volume of powdered biosolids (4) contained the pugmill #1 at an estimated concentration of 55% solids. Use of the mill is important in optimizing these solids materials for contact with the odorant molecules present in the biosolids.

Addition of phosphoric acid (5) via pump 12 at rate 13 acidifies the organics present in the biosolids and significantly assists in the odor control of the mix (and the final product) resulting in less sulfides being liberated throughout processing and less reduced sulfur compound odor, e.g., hydrogen sulfide or mercaptan, being detectable in the finished product. Acidic conditioning of the mix is useful in processing the powdered biosolids for several reasons. Additionally, the addition of phosphoric acid helps to prevent oxidative heating of the finished product when this product is stored statically for long periods of time (see U.S. Patent Application No. 60/654,957). Also it is important to note that this phosphoric acid (5), as well as the iron added in the ferrate (6) and the iron oxide, also known as magnetite (Fe3O4) (9) contribute important plant nutrients to the fertilizer mix. The liquid acid is added to the mix through insertion ring 18 into pugmill #1 (17). It should be noted that the addition of acid in this step could be with the use of concentrated sulfuric acid although this acid tends to create additional reduced sulfur compounds like hydrogen sulfide or mercaptans during processing some of which can end up in the finished product and create problem odors.

As the milled dry biosolids enter mixer or pugmill #1 (17) at rate 4 they are aggressively mixed and converted to a thixotrophic paste-like material that easily reacts with the odor control agents, the acid and any process water (118) also added into pugmill #1. This pugmill is long enough and has sufficient retention time to accomplish this conversion. This pugmill has a horizontal mixing chamber with plow-shaped blending paddles mounted on two powerfully driven shafts that rotate at a speed which divides, mixes, back-mixes and re-divides the materials to be mixed to yield a thorough, uniform blend with reliable consistency. This and the other plow-blending pugmills used in the processing sequence are independently heated by means of a jacketed sleeve around the apparatus. Such heating is adjustable to provide a heated paste prior to blending with the hot ammonium salt. Such heating is also applied to the plow blending apparatus carrying out the mixing of the hot ammonium salt with the thixotrophic paste of conditioned mix.

The mix exiting this initial pugmill #1 should have achieved the temperature of 95 F. Establishment of higher than ambient temperatures in the bioorganic mix facilitates its later homogenous blending with the hot melt of ammonium salts and ensures that the heat energy contained in the ammonium salts is advantageously used to sterilize the mix. Further, the preheating of the thixotrophic or plastic bioorganic paste permits sufficient heat in the mix to occur in the second pugmill such that partial denaturation of proteins and partial hydrolysis of organic molecules that were contained in the input bioorganic material will be facilitated.

The bioorganic mix exits pugmill #1 at rate 33 and enters an elongated pugmill (119). The biosolids mix moves into pugmill #2 at rate 33. The pugmill #2 is heated with hot oil (23) passing through a jacket around outside of the vessel. Simultaneously with the addition of the conditioned mix, a liquid hot or molten ammonium salt mixture enters the pugmill at rate 34. The ammonium salt mixture is manufactured in a reactor (32) by combination of concentrated sulfuric acid (10) and or phosphoric acid (5) with aqueous ammonia (11) at 21% N in nitrogen concentration. The sulfuric acid (10) is added with phosphoric acid (5) at rates 28 via pump 23, and 27 via pump 24 respectively, such that the amount of ammonium sulfate and ammonium phosphate created when mixed with the conditioned mix produces a high nitrogen fertilizer, i.e., a 15% nitrogen by weight in the final fertilizer product. Further this combination of sulfuric acid and phosphoric acid is controlled such that a small amount of acid is in excess of the amount of ammonia also added to the reactor. The finished ammonium salt mix has an exit pH of approximately pH 6.0. The size of the reactor is set such that sufficient resident time occurs for the reaction between the acids and the ammonia to go to completion. The reaction between the acids and the ammonia is violently exothermic. The reaction creates high heat which maintains the resultant ammonium salt in the soluble molten state with any water present in the form of superheated steam. This violent exothermic reaction also will create significant pressure within the reactor vessel. This ammonium salt mix has a temperature characteristic that is greater than 295 F.

If anhydrous ammonia were to be used in place of the aqueous ammonia the temperature will be significantly higher reaching temperatures in excess of 400 F. The temperature of the ammonium salt is such that when it is blended with the conditioned mix in the pugmill #2 the temperature of the blend exceeds 255 F via the combination of the heat from the ammonium melt and the heat provided via the hot oil jacket around the pugmill. The higher the temperature the more denaturization and hydrolysis of proteins and peptides in the organic mix will occur, especially in the acid environment of the interior of the pugmill. The partial denaturing and hydrolysis of the organic molecules in the organic mix creates advantageous properties in the final fertilizer product that result in increased crop production compared to fertilizers that do not contain such organic material, i.e., ammonium sulfate or ammonium phosphate or urea fertilizers.

The pugmill holds hot fertilizer mix for approximately 3 minutes in this apparatus. This time must be greater than 60 seconds and preferably about 5 minutes. During the resident time in pugmill #2 (17) the paddle blades are continually mixing the contents of the pugmill which because of the exothermic reaction occurring will be under some increased pressure. The pugmill #2 may be inclined upward to permit increased pressure within the vessel.

The fertilizer mix exits the pugmill #2 at rate 55 and enters pugmill #3 (120). In pugmill #3 various materials are added to bring the nutrient concentration of the finished product up to the required specification, to increase the hardness and granularity of the finished product and to adjust the pH of the mix to the correct pH as required by the specification of the finished fertilizer product.

The solid nutrients that may be added include urea, ammonium nitrate, mono-ammonium phosphate, diammonium phosphate (57), and or potash (KCL) (58). The solids used to adjust the pH are principally alkaline agents (59) selected from the group comprised of calcium carbonate, sodium hydroxide, calcium oxide, cement kiln dust, lime kiln dust, Class C fly ash, Class F fly ash, multistage burner ash, alum, alum sludge from water treatment and wood ash. Ferric oxide, in this example, it is magnetite (Fe3O4), may be added here for odor control of the mix and final fertilizer product and for iron content in the finished product for agronomic reasons. These solid materials are added via screw conveyors (66, 68, 70 and 22) at specific rates for each compound, diammonium or mono ammonium phosphate (67), potash (69) and the alkaline agent at rate 71 and the ferric oxide (9) at rate 26. These solids are conveyed to a pulverizing mill (72) to increase the efficiency of blending and reaction with the fertilizer mix entering the pugmill 120 from the pressure vessels. The powder is then transported via a screw conveyor at combined rate 73 to enter the pugmill 120. In this example only magnetite (Fe3O4) (9) is added to pugmill #3 to bring the iron content to 2% in the final fertilizer product.

Liquid additives preferably include nutrients such as UAN (urea ammonium nitrate) and soluble urea (both not shown in FIG. 3). The liquid additions also include pH adjustment materials (54) such as acids, e.g., phosphoric acid or sulfuric acid, or caustic solutions, e.g., sodium hydroxide. These are pumped (60, 62, and 64) are respective rates (61, 63, and 65) to enter pugmill #3 (120).

The pugmill #3 is preferably jacketed to heat the fertilizer mix within to prepare the mix for injection into the shaping mechanism. The heat is applied through a jacketed chamber around the pugmill heated with hot oil 41. Exhausted oil is returned to the oil heater through pipes 35 from pugmill #3 and pugmills #1 (17) and pugmill #2 (119).

Pugmill #3 is long enough and has sufficient retention time and agitation via the double shafted plow blending paddles to blend the additives with the fertilizer mix and insure the retention of sufficient heat to achieve effective shaping.

Shaping may occur by use of a traditional granulator containing a heated seed bed or it may occur by extrusion technology or innovatively by tablet formation as used in the pharmaceutical industry.

In this example the discharge from pugmill #3 is screw conveyed at rate 75 to an extruder machine (76) that contains dies permitting a 3 mm diameter extrusion of the mix. A high speed air cutter cleaves the extrusion to a arrange of 3 mm to 3.5 mm. The temperature of the mix in this example was 225 F but it should be in the range of 212 F to 350 F and preferably in the range from 250 F to 300 F. Further the percent solids of the fertilizer mix can be controlled by the withdrawal of steam and water vapor via (53) from pugmill #3 and from the extruder (76). The computer controlled removal of water is such that the fertilizer mix is the correct solids for shaping. The percent solids of the mix in this example was 74% but it should be in the range from 40% to 85% with the preferred range from 50% to 80% and the more preferred range from 60% to 75%.

The retention time in the shaping apparatus is not critical to the process but will range between 30 seconds and 15 minutes. In this example it was about 1.1 minutes.

Pelletized fertilizer mix exits the extruder 76 at a percent solids range of about 88% but should range from 80% to 94% and preferably in the range of 85% to 94%. The temperature of the exiting mix is 195 F but should range between 185 F and 225 F although this range is not critical for operation of the fluidized bed dryer (88) or rotary drum (not shown in FIG. 5) dryer. The retention time in the dryer is between 3 and 25 minutes depending upon the design and size of the dryer. The dryer illustrated in FIG. 5 is a vertical fluidized bed dryer which operates by keeping the drying fertilizer granules in suspension while hot air passed upward past them removing water and increasing dryness to the specified level. The time in the dryer in this example was about 9 minutes. The product in this example achieved 97% dryness; however, the range of dryness of the product should range from 90% to 100% with the preferred range from 96% to 99%.

Dry, pelletized fertilizer is then passed (87) to the screen system (81) where the specification size is removed at rate 91 for coating with hot oil. The specification size may be varied dependent upon customer requirements, however, the range of suitable product for sale is between 0.7 mm and 3.2 mm with the commercial range for normal sized fertilizer is between 2 mm and 4 mm. The present invention also can manufacture a minimal sized product suitable for use in golf course applications which ranges from 0.7 mm to 1.3 mm.

Any undersized material after shaping is directly conveyed back to the pugmill #3 at rate 86. Any oversized material is conveyed to hammer mill or mill 82 where it is pulverized 83 and returned to either the pugmill #3 via common conveyor 86.

The specification fertilizer product is conveyed to a oil coating apparatus, e.g., a coating drum (93) in this example. The coating oil or material is contained in a container (92) that must be heated in this example to about 180 F to keep it fluid for application. The coated pellets which are still hot then pass to a cooler apparatus, e.g., air blown cooler (96) for reduction in temperature to less than 130° F. in this example.

Following cooling the finished product is weighed (not shown in FIG. 3) and conveyed (97) to dry storage pending bagging and or bulk shipment.

The process air from the pugmill #3 (53), extruder (90), fluidized bed dryer, the screens, mill, oil coating drum and air pellet cooler is ducted to the bag house (102) to be filtered while still hot enough to carry the removed water as vapor. The cleaned air is passed to a condenser (104) where the air is cooled with clean water sufficiently that the water vapor is converted to liquid which is piped to pugmill #1 to create a thixotrophic paste from the powdered biosolids or removed from the process to a sewer or water treatment system prior to discharge to the environment. The process air following condensation is passed to an acid (105) and caustic (106) scrubber for odorant removal prior to its passing to a biotrickling filter (111) for final removal of all odorants. This unit employs a medium with microorganisms using clean water and process water (not shown in FIG. 5) mixed with the proper nutrient at rate to wet the medium and feed the microorganisms. Air may be recycled to provide sufficient retention time until odors are removed prior to discharge (116) to an exhaust fan (117) for discharge to the environment.

Example 2

This example describes the approach of modifying the production of heat-dried biosolids within a municipally operated wastewater treatment plant. The plant produced dewatered biosolids a chemically modified prior to drying such that plant nutrient chemicals and odor control agents are added such that the final pellet product is significantly improved as a fertilizer so that it can be sold into the fertilizer market for commercial agriculture.

This example results in full scale operation of a municipal wastewater treatment plant producing beneficiated heat dried biosolids pellets or granules. Because some of the additives contain plant nutrients such as nitrogen, phosphorus and other plant nutrients such as potassium and or sulfur, the fertilizer value of the pellet will be increased. The pellets that are anticipated as a product of the improved processing scheme (the present invention) are referred to as inorganically-augmented bioorganic fertilizer. There is an increasing need for organically-based fertilizers in the U.S. and worldwide agricultural marketplace. After years and years of repetitive inorganic fertilizer application the soils of farms, especially commercial farms are in desperate need of organic content to maintain expected (and now economically required) crop production rates.

Many cities have been in the business of producing a high quality heat-dried pellet from their biosolids following belt filter pressing or centrifuge dewatering procedures. Unfortunately these pellets often have a detrimental odor associated with them which has very adversely affected the ability of municipality to market these into the agricultural community. Often the cities are forced to mix their dried pellets with soil and bury them in a landfill. The traditional pellet manufacturing system provides little or no recovery of costs associated with production of the heat-dried biosolids or their eventual disposition. Early in the history of production of heat dried biosolids pellets or granules the market for the sale of non-beneficiated dried pellets or granules was sufficient to cause them to be transported to farms for their application as a low grade fertilizer or soil conditioner. When larger numbers of municipal heat drying pellet producing operations when on line then the supply of this fertilizer outstripped its commercial marketplace and the price fell to a level that requires subsidy payments by the municipality to ensure timely removal and disposition of the finished pellets. This example for the present invention creates a product that has sufficient characteristics and plant nutrients to command a suitable price to permit its timely transport and sale into the commercial agricultural fertilizer marketplace.

There are a number of chemical additions to the city's biosolids. The types of additives planned are: 1) acids but with the finished pellet pH meeting fertilizer requirements; 2) oxidants for odor control; and 3) specific binder materials to create harder finished pellet products to meet agricultural specifications for hardness.

This example also utilized the addition of iron oxide will have a positive effect on the odor of the finished dry pellets. The use of this material introduces a wide prospect of differing chemical and physical forms and grades of this material. Again, similar to additions of nitrogen and phosphorus, the addition of iron will beneficiate the plant nutrient value of the enhanced city's finished pellet.

The action or input locations where modifications to the existing municipal heat drying biosolids process to beneficiate the pellet product are shown in FIG. 1 in Notes #1 and #2. The majority of chemical additions will be at one or two pug mills placed into the municipality's process scheme and which are located after the dewatering of the material by centrifuge (see #2 in FIG. 1). The various additives which are described below are added here and blended into the dewatered biosolids.

It is very important to evaluate the potential value of the augmented dried pellets that are created. It is a goal that the commercial value of the pellets be beneficiated or enhanced so that they can be competitively sold into the fertilizer marketplace. This will remove the negative costs associated with the present practice of mixing dried pellets with soil and burying them in a landfill. Instead, the beneficiated pellets will be sold for significant positive value because the augmentation strategy will create a high value if implemented on a full scale by the municipality. An average chemical plant nutrient quality of a municipal dried biosolids pellets has an N content of 2 to 5 percent, but can be made significantly more valuable by increasing the N components. The nitrogen content will be increased to 12 percent nitrogen (N), 8 percent phosphorus (P as in $P_2O_5$) and 2% iron (Fe). No potash is added in this example so that a 12-8-0 (N-P-K) fertilizer was manufactured. Such a product creates positive product value for the municipality and removes the negative value presently associated with this product.

Figure 6:
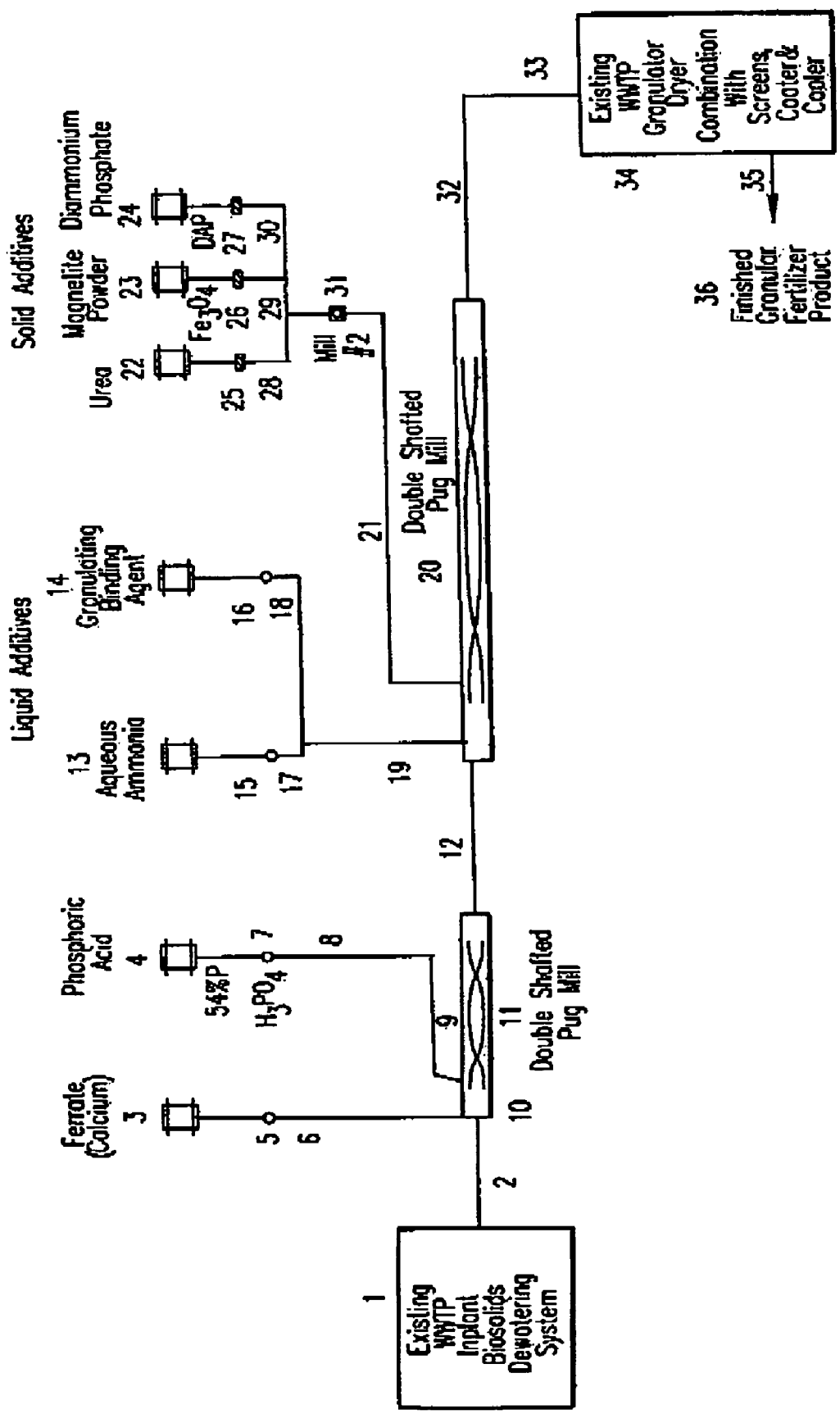
FIG. 6 Pellet Beneficiation Process for Wastewater Treatment Plants.

FIG. 6 shows the details of the additive chemicals used in this example. The dewatered biosolids was produced as before the present invention is introduced in to the process scheme. To accomplish the chemical additions it is preferred that two pug mills are inserted into the conveying system after the dewatering step and prior to the shaping of the material and its drying to pellets or granules. Both liquid and solid additions are made to pugmill #1 (11). Initially, as in Example 1, ferrate is manufactured on site and is pumped from its storage container (3) via pump 5 at rate 6 to the pugmill #1. Ferrate is a strong oxidant and rapidly reacts with reduced sulfur compounds and also reacts with proteins as described earlier. Second, a strong acid, preferably phosphate acid is pumped (4) at a rate (8) to the pugmill at orifice (9) for mixing as well. This acid helps in producing a thixotrophic mix from the dewatered biosolids and helps with the odor control process. Other odor control agents, hydrogen peroxide and calcium hypochlorite can be used in the present invention but were not used in this example.

The pugmill #1 is configured as a double shafted plow bladed pugmill. The mix passing through this pugmill is thoroughly mixed and is a thixotrophic paste as it is discharged to pugmill #2 (20). Pugmill #2 receives plant nutrients from containers housed at the wastewater treatment plant. The solids are milled (31) prior to being introduced to an orifice in the pugmill. In this example, urea (22) is added via screw conveyor (25) at a controlled rate (28) to the mill (31). Similarly, magnetite, $Fe_3O_4$, (23) is also added as a nutrient and as an odor control agent through conveyor (27) to the mill (31) for delivery to the pugmill and mixing with the conditioned biosolids. Also, in this example, a granulating agent (14), lignon, via pump 16 was also added at rate 18 to assist in the hardening of the finished dry granule. Upon discharge from the pugmill #2 the fertilizer mix reenters at rate (33) the processing train (34) of the municipal wastewater treatment plant and is shaped and dried into pellets or granules (36) and discharged at a rate (35). The finished product in this example, as a 12-8-0 fertilizer can be marketed as a commodity agricultural fertilizer.

Other embodiments and uses of the invention will be apparent to those skilled in the art from consideration of the specification and practice of the invention disclosed herein. All references cited herein, including all publications, U.S. and foreign patents and patent applications, and materials of any kind which are cited to herein, are specifically and entirely incorporated by reference. It is intended that the specification and examples be considered exemplary only.

The invention claimed is:

1. A method for the manufacture of a fertilizer comprising:
   mixing dewatered biosolids, an oxidant, and a concentrated acid to form a thixotropic mixture;
   subjecting the thixotropic mixture to a pressure exceeding atmospheric pressure;
   adjusting the pH of the thixotropic mixture to a pH of between pH 4.5 and pH 7.0;
   mixing granulating agents into the mixture; and
   drying the mixture to greater than 90% solids to produce a beneficiated, dried-biosolids fertilizer.

2. The method of claim 1, wherein the oxidant is selected from the group consisting of ferrates, chlorine dioxide, hydrogen peroxide, oxygen, ozone and combinations thereof.

3. The method of claim 1, wherein the beneficiated, dried-biosolids fertilizer has an inorganic plant nutrient value of 8% to 22% nitrogen.

4. The method of claim 1, wherein the beneficiated, dried-biosolids fertilizer has little to no detectable odor as compared to the dewatered biosolids.

5. The method of claim 1, further comprising adding an inorganic plant nutrient to the thixotropic mixture.

6. The method of claim 5, wherein the inorganic plant nutrient is selected from the group consisting of solid fertilizers, iron, nitrogen, potassium, sulfur, ammonium salts, ammonium sulfate, ammonium nitrate, mono-ammonium phosphate, di-ammonium phosphate, potash, urea, methylene urea, sulfur-coated urea, liquid fertilizers, urea ammonium nitrate ("UAN"), liquid urea, liquid N-P-K fertilizers 16-4-8, 10-8-8 or 6-14-6, and combinations thereof.

7. The method of claim 1, further comprising adding a hardener to the thixotropic mixture.

8. The method of claim 1, further comprising forming pellets or granules.

9. The method of claim 8, wherein the pellets or granules are coated with an agent to reduce dust and abrasion.

10. The method of claim 9, wherein the coated pellets or granules are cooled to less than 55° C.

11. The method of claim 1, which is conducted entirely within a single heat-drying facility.

12. The method of claim 1, further comprising adding a chemical additive directly to the dewatered biosolids to produce a thixotropic mixture prior to drying.

13. The method of claim 12, wherein the chemical additive is added to the dewatered biosolids without making a slurry.

14. The method of claim 1, wherein the concentrated acid reacts with aqueous or anhydrous ammonia to produce ammonium salts.

15. The method of claim 14, wherein the concentrated acid is phosphoric acid, sulfuric acid, or both.

16. The method of claim 1, further comprising adding a plant nutrient to the mix to enhance fertilizer value.

17. A method for the manufacture of a fertilizer comprising:
   mixing dried biosolids, an oxidant, and a concentrated acid to form a thixotropic mixture;
   subjecting the thixotropic mixture to a pressure exceeding atmospheric pressure;
   adjusting the pH of the thixotropic mixture to a pH of between pH 4.5 and pH 7.0 by adding an inorganic plant nutrient; and
   producing a beneficiated, dried-biosolids fertilizer.

18. The method of claim 17, wherein the dried biosolids are greater than 90% solids.

19. The method of claim 17, wherein the dried biosolids comprise pellets or granules.

20. The method of claim 17, wherein the oxidant is selected from the group consisting of ferrates, chlorine dioxide, hydrogen peroxide, oxygen, ozone and combinations thereof.

21. The method of claim 17, wherein the beneficiated, dried-biosolids fertilizer has an inorganic plant nutrient value of 8% to 22% nitrogen.

22. The method of claim 17, wherein the beneficiated, dried-biosolids fertilizer has little to no detectable odor as compared to the dewatered biosolids.

23. The method of claim 17, wherein the inorganic plant nutrient is selected from the group consisting of solid fertilizers, iron, nitrogen, potassium, sulfur, ammonium salts, ammonium sulfate, ammonium nitrate, mono-ammonium phosphate, di-ammonium phosphate, potash, urea, methylene urea, sulfur-coated urea, liquid fertilizers, urea ammonium nitrate ("UAN"), liquid urea, liquid N-P-K fertilizers 16-4-8, 10-8-8 or 6-14-6, and combinations thereof.

24. The method of claim 17, further comprising adding a hardener or granulating agent to the thixotropic mixture.

25. The method of claim 17, further comprising cooling the dried mixture to less than 55° C.

26. The method of claim 17, wherein manufacture of the dried biosolids takes place independently of the manufacture of the beneficiated, dried biosolids fertilizer.

27. The method of claim 17, wherein manufacture of the dried biosolids takes place in a different facility than the facility where the beneficiated, dried biosolids fertilizer is manufactured.

28. The method claim 17, wherein the manufacture of the beneficiated, dried-biosolids fertilizer avoids transportation of untreated biosolids from a wastewater treatment plant.

29. The method of claim 17, wherein the concentrated acid reacts with aqueous or anhydrous ammonia to produce ammonium salts.

30. The method of claim 17, wherein the concentrated acid is phosphoric acid, sulfuric acid, or both.

* * * * *

UNITED STATES PATENT AND TRADEMARK OFFICE
CERTIFICATE OF CORRECTION

| | | |
|---|---|---|
| PATENT NO. | : 7,662,205 B2 | |
| APPLICATION NO. | : 11/371238 | |
| DATED | : February 16, 2010 | |
| INVENTOR(S) | : Jeffrey C. Burnham | |

It is certified that error appears in the above-identified patent and that said Letters Patent is hereby corrected as shown below:

In the Specification:

In column 4, line 36, after "to" please insert --dewatered biosolids and concentrated acid to form a thixotropic mixture.--

In column 4, line 37, please delete "Another embodiment of the invention is directed to"

In column 8, line 18, please delete "thixotrophic" and insert therefore --thixotropic--

In column 8, line 64, please delete "thixotrophic" and insert therefore --thixotropic--

In column 9, line 61, please delete "thixotrophic" and insert therefore --thixotropic--

In column 11, line 6, please delete "thixotrophic" and insert therefore --thixotropic--

In column 11, line 66, please delete "thixotrophic" and insert therefore --thixotropic--

In column 12, line 52, please delete "thixotrophic" and insert therefore --thixotropic--

In column 12, line 66-67, please delete "thixotrophic" and insert therefore --thixotropic--

In column 13, line 7, please delete "thixotrophic" and insert therefore --thixotropic--

In column 15, line 47, please delete "thixotrophic" and insert therefore --thixotropic--

In column 17, line 30, please delete "thixotrophic" and insert therefore --thixotropic--

In column 17, line 37, please delete "thixotrophic" and insert therefore --thixotropic--

Signed and Sealed this
Twenty-fifth Day of October, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,662,205 B2 | |
| APPLICATION NO. | : 11/371238 | |
| DATED | : February 16, 2010 | |
| INVENTOR(S) | : Jeffrey C. Burnham | |

It is certified that error appears in the above-identified patent and that said Letters Patent is hereby corrected as shown below:

Title Page, Item (60), please insert after "Jul. 20, 2005" --, provisional application No. 60/704458, filed on Aug. 2, 2005--

In the Specification:

In column 1, line 8, please delete "and" after "Mar. 9, 2005;"

In column 1, line 11, please insert after "Jul. 20, 2005" --; and U.S. Provisional Application No. 60/704458, entitled "Process to Increase Plant Nutrient Content in Heat-Dried Organic-Based Sludges," filed Aug. 2, 2005--

In column 1, line 11, please delete "both" and insert therefore --each--

Signed and Sealed this
Twenty-third Day of July, 2013

Teresa Stanek Rea
*Acting Director of the United States Patent and Trademark Office*